No. 752,269. PATENTED FEB. 16, 1904.
H. A. TWIGG.
COLLAR SHAPER.
APPLICATION FILED APR. 18, 1903.
NO MODEL. 2 SHEETS—SHEET 1.

Witnesses
Otto E. Hoddick.
Dena Nelson.

H. A. Twigg,
Inventor

By
Attorney

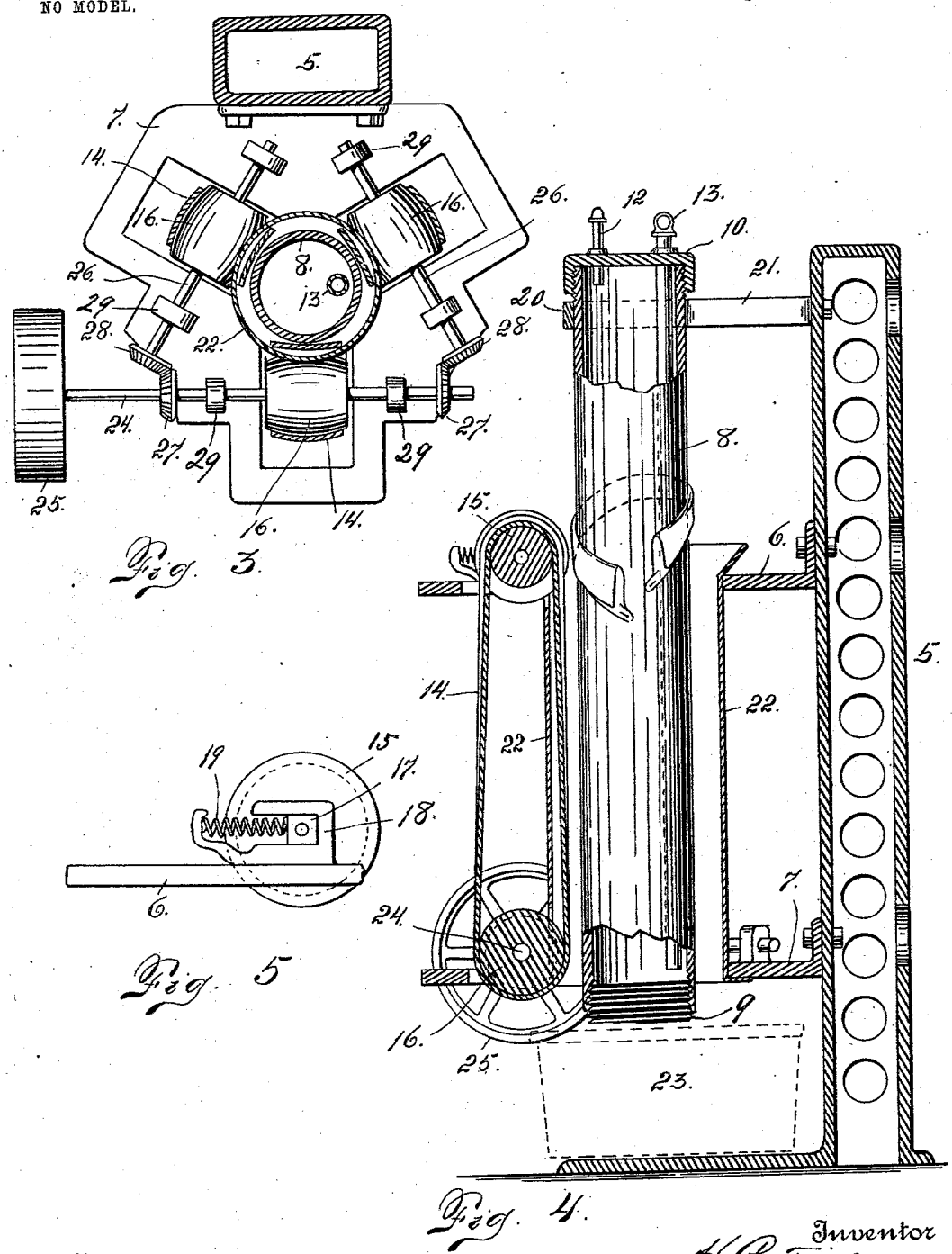

No. 752,269. Patented February 16, 1904.

UNITED STATES PATENT OFFICE.

HENRY A. TWIGG, OF DENVER, COLORADO.

COLLAR-SHAPER.

SPECIFICATION forming part of Letters Patent No. 752,269, dated February 16, 1904.

Application filed April 18, 1903. Serial No. 153,333. (No model.)

*To all whom it may concern:*

Be it known that I, HENRY A. TWIGG, a citizen of the United States of America, residing in the city and county of Denver and State of Colorado, have invented certain new and useful Improvements in Collar-Shapers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in collar-shapers, being more especially intended for shaping turned-down collars.

My object is to provide a machine of this class which shall be automatic in operation, the collars being held in position and made to travel along and in contact with the heated cylinder during the shaping operation. This is accomplished by an arrangement of belts around the cylinder, the moving belts carrying the collars along while in contact therewith, the cylinder being surrounded by a jacket open at both ends and through which the belts pass.

Having briefly outlined my improved construction, as well as the function it is intended to perform, I will proceed to describe the same in detail, reference being made to the accompanying drawings, in which is illustrated an embodiment thereof.

Figure 2:
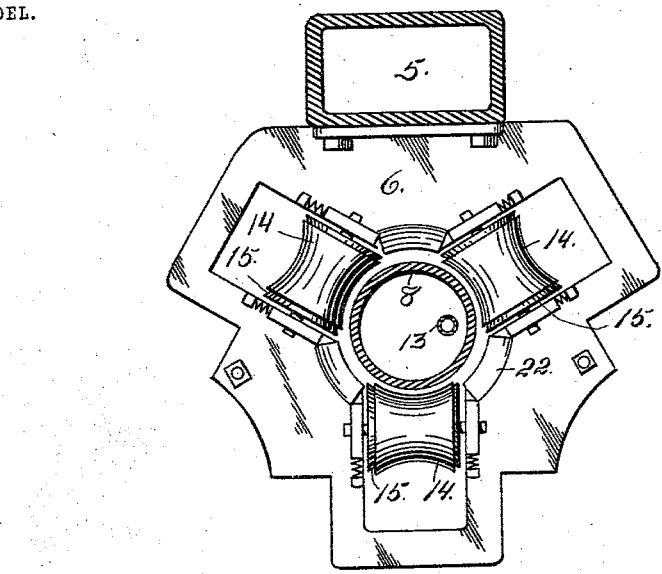
Figure 1:
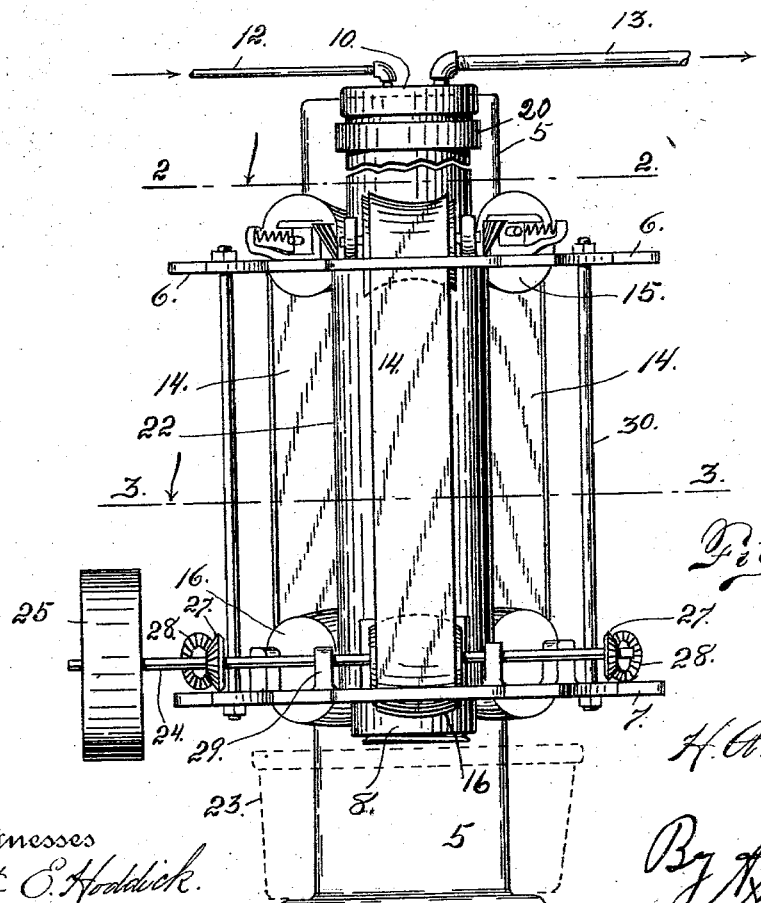

In the drawings, Figure 1 is an elevation of my improved collar-shaping apparatus, the upper portion of the cylinder being broken. Fig. 2 is a section taken on the line 2 2, Fig. 1, looking downwardly. Fig. 3 is a section taken on the line 3 3, Fig. 1, looking downwardly. Fig. 4 is an elevation, partly in section, illustrating the complete apparatus. Fig. 5 is a detail view showing a pulley with its journal-box.

The same reference characters indicate the same parts in all the views.

Let the numeral 5 designate a stationary vertical column to which are attached two horizontal cast-iron plates 6 and 7. These plates are connected by tie-rods 30. Suitably mounted on these plates and occupying a position parallel with the column 5 is a hollow cylinder 8, closed at the bottom by a screw-plug 9. To the top of the cylinder is applied a screw-cap 10, which is apertured to receive the delivery end of a steam-pipe 12 for heating the cylinder. A pipe 13, leading from the bottom of the cylinder, also passes through the screw-cap and carries off the water of condensation. The steam-pressure forces the water out through the pipe 13. Suitably supported on the plates 6 and 7, surrounding the cylinder between the said plates and projecting slightly above the upper plate, is a jacket 22. A number of belts 14 are arranged around the hollow cylinder and pass between the cylinder and the jacket, sufficient space being left for the purpose. Three of these belts are shown in the drawings, and they are mounted on upper and lower pulleys or rollers 15 and 16. The pulleys 15, which are uppermost, are journaled in spring-held boxes 17, slidably mounted in brackets 18, formed on the plate 6. The boxes 17 are engaged by springs 19, which bear against the said boxes at one extremity and a part of the bracket at the opposite extremity. (See Fig. 5.) The faces of these pulleys 15 are interiorly curved to conform to the curve of the cylinder 8, and the belts are so located with reference to the cylinder that the collars mounted on the cylinder are carried along thereon by the engagement of the belts. The jacket 22 is slotted or cut away at the top and bottom to make room for the rollers or pulleys.

The upper extremity of the cylinder 8 is surrounded by a collar 20, which is connected with the column 5 by an arm 21, whereby the cylinder is suitably supported in the upright position.

When the apparatus is in use, the collars having been properly ironed are applied by hand to the cylinder just above the upper extremity of the jacket. These collars are caught by the belts and carried downwardly automatically in contact with the cylinder and discharged therefrom at the lower extremity of the jacket, whence they pass into a basket or other suitable receptacle 23 below.

The belt-carrying pulleys and rollers are operated from a shaft 24, provided with an operating-pulley 25. One of the pulleys 16 is fast on this shaft, and shafts 26, upon which the other pulleys 16 are mounted, are connected with the shaft 24 by beveled gears 27 and 28. The shafts 24 and 26 are provided with suitable bearings 29, formed on the plate 7.

Having thus described my invention, what I claim is—

1. In a collar-shaper, the combination of a cylinder adapted to be heated, and a number of endless traveling belts or aprons arranged around the cylinder and in such proximity thereto that collars applied to the cylinder are held in position and made to travel thereon during the shaping operation.

2. A collar-shaper comprising a hollow cylinder adapted to be heated from the inside, and endless traveling belts arranged around the cylinder and coöperating therewith, whereby collars applied thereto are held in place and made to travel thereon during the shaping operation.

3. A collar-shaper comprising a hollow cylinder supported in a vertical position, a number of belts arranged around the cylinder and traveling in planes parallel with its axis and in such proximity thereto that collars applied to the cylinder will be held in place thereon by the belts and made to travel during the shaping operation.

4. In a collar-shaper, the combination of a cylinder adapted to be heated, an open-ended jacket surrounding the cylinder a portion of its length, and a number of endless belts suitably mounted and passing through the jacket in such proximity to the cylinder that collars applied thereto at one end of the jacket are made to travel along the cylinder during the shaping operation.

5. In a collar-shaper, the combination of a hollow cylinder, a steam-pipe connected with the interior of the cylinder for heating purposes, a conduit for drawing off the water of condensation, a jacket surrounding the cylinder, and traveling devices passing between the jacket and the cylinder for causing the collars applied thereto to travel along the same during the shaping operation.

6. In a collar-shaper, the combination of a hollow cylinder, means for heating the same from the inside, a jacket surrounding the cylinder and open at both ends, pulleys or rollers mounted at each end of the cylinder, the upper pulleys projecting above the jacket and having their faces curved to conform to the curve of the cylinder, and endless belts mounted on the pulleys or rollers and passing between the jacket and the cylinder and in such proximity to the latter that collars applied to the cylinder are made to travel thereon during the shaping operation.

7. In a collar-shaper, the combination of a hollow cylinder, a steam-pipe connected with the interior for heating purposes, a conduit for drawing off the water of condensation, and means arranged around the cylinder and traveling lengthwise thereof for causing the collars applied thereto to travel along the same in the direction of its axis during the shaping operation.

8. In a collar-shaper, the combination of a hollow cylinder, means for heating the cylinder, and means arranged around the cylinder and traveling lengthwise thereof for causing the collars applied thereto, to travel along the same in the direction of its axis.

In testimony whereof I affix my signature in presence of two witnesses.

HENRY A. TWIGG.

Witnesses:
DENA NELSON,
A. J. O'BRIEN.